United States Patent
Marks et al.

(10) Patent No.: US 10,058,088 B2
(45) Date of Patent: Aug. 28, 2018

(54) ANIMAL TRAP WITH SIMPLIFIED, HIGH SPEED OPERATION

(71) Applicants: Joel S. Marks, Sherman Oaks, CA (US); Surapon Arleekul, Sherman Oaks, CA (US)

(72) Inventors: Joel S. Marks, Sherman Oaks, CA (US); Surapon Arleekul, Sherman Oaks, CA (US)

( * ) Notice: Subject to any disclaimer, the term of this patent is extended or adjusted under 35 U.S.C. 154(b) by 0 days.

(21) Appl. No.: 15/674,524

(22) Filed: Aug. 11, 2017

(65) Prior Publication Data

US 2017/0367318 A1   Dec. 28, 2017

Related U.S. Application Data

(63) Continuation of application No. 14/630,327, filed on Feb. 24, 2015, now Pat. No. 9,730,437.

(60) Provisional application No. 61/947,341, filed on Mar. 3, 2014.

(51) Int. Cl.
  *A01M 23/18* (2006.01)
(52) U.S. Cl.
  CPC ........... *A01M 23/18* (2013.01); *H05K 999/99* (2013.01)
(58) Field of Classification Search
  CPC ...... A01M 23/16; A01M 23/18; A01M 23/20; A01M 23/22
  USPC ........................................................ 43/61, 62
  See application file for complete search history.

(56) References Cited

U.S. PATENT DOCUMENTS

| | | | |
|---|---|---|---|
| 100,986 A | 3/1870 | Corning |
| 130,667 A | 8/1872 | Smith |
| 146,887 A | 1/1874 | Doremus |
| 181,105 A | 8/1876 | Rice |
| 253,907 A | 2/1882 | André |
| 298,361 A | 5/1884 | Erling |
| 363,536 A | 5/1887 | Oliver |
| 383,972 A | 6/1888 | Mittler |
| 441,677 A | 12/1890 | Lovell |
| 589,802 A | 9/1897 | Smock |
| 844,517 A | 2/1907 | Haas |
| 866,987 A | 9/1907 | Turner |
| 884,380 A | 4/1908 | Hadley |

(Continued)

FOREIGN PATENT DOCUMENTS

| CN | 201580022492 | 11/2017 |
|---|---|---|
| DE | 19857452 A1 | 6/2000 |

(Continued)

OTHER PUBLICATIONS

PCT/US2015/017743 ISR and Written Opinion dated May 20, 2015.

*Primary Examiner* — Peter M Poon
*Assistant Examiner* — Danielle A Clerkley
(74) *Attorney, Agent, or Firm* — Paul Y. Feng; One LLP

(57) ABSTRACT

A live animal trap with improvements to ease of use, reliability and cost is disclosed. A simple repeatable one-hand set action lifts a front entry door. A hold-close assembly trips to secure the front door without sliding motions. A low friction latch and trip links thereto provide consistent set action resistant to shaking and undesired trip. A rear door is fitted next to a bait location to allow near vertical access for bait placement and unattended, unobstructed release. A changeable torque arm provides adjustable trip force. A trip tray is spaced above a floor to require a small set-up motion to access the bait and further ensure trip.

20 Claims, 6 Drawing Sheets

(56) References Cited

U.S. PATENT DOCUMENTS

| | | |
|---|---|---|
| 1,020,448 A | 3/1912 | Recko |
| 1,024,278 A | 4/1912 | Niederlitz |
| 1,139,849 A | 5/1915 | Collins |
| 1,181,044 A | 4/1916 | Stringfellow |
| 1,261,189 A | 4/1918 | Tremble |
| 1,261,899 A | 4/1918 | Borszcz |
| 1,283,232 A | 10/1918 | Lewis |
| 1,294,364 A | 2/1919 | Bales |
| 1,297,893 A | 3/1919 | Nash |
| 1,305,054 A | 5/1919 | Blevins |
| 1,318,246 A | 10/1919 | Underwood |
| 1,407,909 A | 2/1922 | Wyskwarko |
| 1,410,738 A | 3/1922 | Dorseth |
| 1,453,795 A | 5/1923 | Hovell |
| 1,453,796 A | 5/1923 | Hovell |
| 1,645,444 A | 10/1926 | Moore |
| 1,728,701 A | 9/1929 | Sholin |
| 1,747,380 A | 2/1930 | McCully |
| 1,990,861 A | 2/1935 | Exum |
| 2,038,068 A | 4/1936 | Wagner |
| 2,129,594 A | 9/1938 | Shimamoto |
| 2,155,006 A | 4/1939 | Cooper |
| 2,156,213 A | 4/1939 | White |
| 2,167,291 A | 7/1939 | Bowman |
| 2,232,604 A | 2/1941 | Helmick |
| 2,257,246 A | 9/1941 | Rudolph |
| 2,284,867 A | 6/1942 | Harris |
| 2,387,811 A | 10/1945 | Smith |
| 2,440,570 A | 4/1948 | Bourgeois |
| 2,447,147 A | 8/1948 | Warner |
| 2,485,319 A | 10/1949 | Rosen |
| 2,488,202 A | 11/1949 | Kern |
| 2,502,836 A | 4/1950 | Eggering |
| 2,524,504 A | 10/1950 | Woolworth |
| 2,540,418 A | 2/1951 | Bird |
| 2,562,809 A | 7/1951 | Mogren |
| 2,586,110 A | 2/1952 | Stilborn |
| 2,589,002 A | 3/1952 | Vonada |
| 2,598,007 A | 5/1952 | McCormick |
| 2,611,989 A | 9/1952 | Larson |
| 2,620,589 A | 12/1952 | Jones |
| 2,692,453 A | 10/1954 | Wingfield |
| 2,717,471 A | 9/1955 | Sullivan |
| 2,752,722 A | 7/1956 | Gardner |
| 2,774,175 A | 12/1956 | Maddocks |
| 2,793,464 A | 5/1957 | Bird |
| 2,803,918 A | 8/1957 | Hall |
| 2,825,176 A | 3/1958 | Floied |
| 3,113,395 A | 12/1963 | Kuren |
| 3,174,250 A | 3/1965 | Gilbert |
| 3,190,030 A | 6/1965 | Gilbaugh |
| 3,394,487 A | 7/1968 | Wood et al. |
| 3,624,951 A | 12/1971 | Gilbaugh |
| 3,823,504 A | 7/1974 | Dosch |
| 3,834,063 A | 9/1974 | Souza et al. |
| 3,913,258 A | 10/1975 | Souza et al. |
| 3,975,857 A | 8/1976 | Branson et al. |
| 4,080,749 A | 3/1978 | Gilbaugh |
| 4,159,590 A | 7/1979 | Palfalvy |
| 4,162,588 A | 7/1979 | Wyant |
| 4,179,835 A | 12/1979 | Hunter |
| 4,232,472 A | 11/1980 | Muelling |
| 4,254,976 A | 3/1981 | Shoberg |
| 4,335,535 A | 6/1982 | Lindley |
| 4,341,033 A | 7/1982 | Siegel |
| 4,342,172 A | 8/1982 | Guanci |
| 4,546,568 A | 10/1985 | Seyler |
| 4,557,067 A | 12/1985 | Ha |
| 4,590,704 A | 5/1986 | Volk |
| 4,682,440 A | 7/1987 | Hunter |
| 4,682,441 A | 7/1987 | Strayer |
| 4,685,245 A | 8/1987 | LaPier |
| 4,707,943 A | 11/1987 | Benigno |
| 4,829,700 A | 5/1989 | Ha |
| 4,829,701 A | 5/1989 | ImBrogno |
| 4,899,484 A | 2/1990 | Morin |
| 4,912,872 A | 4/1990 | Wynnn et al. |
| 5,329,723 A | 7/1994 | Liul |
| 5,345,710 A | 9/1994 | Bitz |
| 5,615,514 A | 4/1997 | Meade, Jr. |
| 5,778,594 A | 7/1998 | Askins et al. |
| 5,845,432 A | 12/1998 | Tully et al. |
| 5,862,624 A | 1/1999 | Askins |
| 5,864,982 A | 2/1999 | Tully et al. |
| 6,029,393 A | 2/2000 | Stewart |
| 6,164,008 A | 12/2000 | Kelley |
| 6,484,436 B1 | 11/2002 | Chang |
| 6,543,179 B1 | 4/2003 | Lee |
| 6,588,139 B2 | 7/2003 | Kao et al. |
| 6,609,327 B2 | 8/2003 | Stoico et al. |
| 6,618,982 B2 | 9/2003 | Lafforthun |
| 6,658,788 B1 | 12/2003 | Steinfest |
| 6,834,460 B1 | 12/2004 | Liu |
| 6,938,368 B2 | 9/2005 | Guidry |
| 7,370,451 B2 | 5/2008 | Rich et al. |
| 7,540,109 B2 | 6/2009 | Hall |
| 7,757,427 B2 | 7/2010 | Bucher |
| 7,793,460 B2 | 9/2010 | Ha |
| 8,046,953 B2 | 11/2011 | Radesky et al. |
| 8,230,641 B2 | 7/2012 | Rich et al. |
| 8,250,802 B2 | 8/2012 | Radesky et al. |
| 8,359,783 B1 | 1/2013 | Kamery et al. |
| 2002/0011019 A1* | 1/2002 | Stoico .................. A01M 23/16 43/58 |
| 2002/0035801 A1 | 3/2002 | Ogura |
| 2008/0115405 A1* | 5/2008 | Bucher ................ A01M 23/18 43/61 |
| 2008/0282600 A1* | 11/2008 | Rich .................... A01M 23/18 43/61 |
| 2009/0211146 A1* | 8/2009 | Radesky .............. A01M 23/18 43/61 |
| 2011/0005122 A1 | 1/2011 | Bucher |

FOREIGN PATENT DOCUMENTS

| | | |
|---|---|---|
| FR | 2728141 A1 | 6/1996 |
| GB | 2193425 A | 2/1988 |
| GB | 2216764 A | 10/1989 |
| GB | 2258381 A | 2/1993 |
| WO | 0209502 A1 | 2/2002 |

* cited by examiner

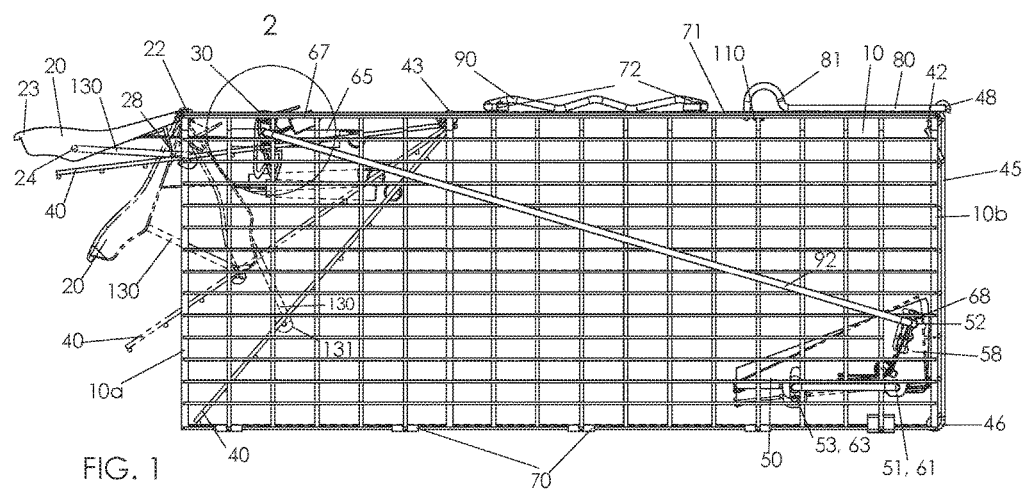
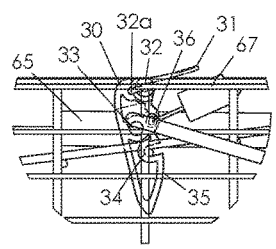
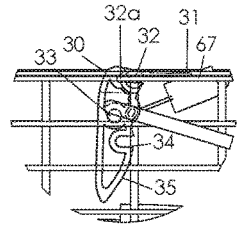
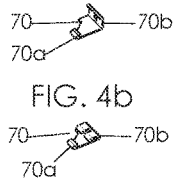
FIG. 1
FIG. 2
FIG. 3
FIG. 4a
FIG. 4b

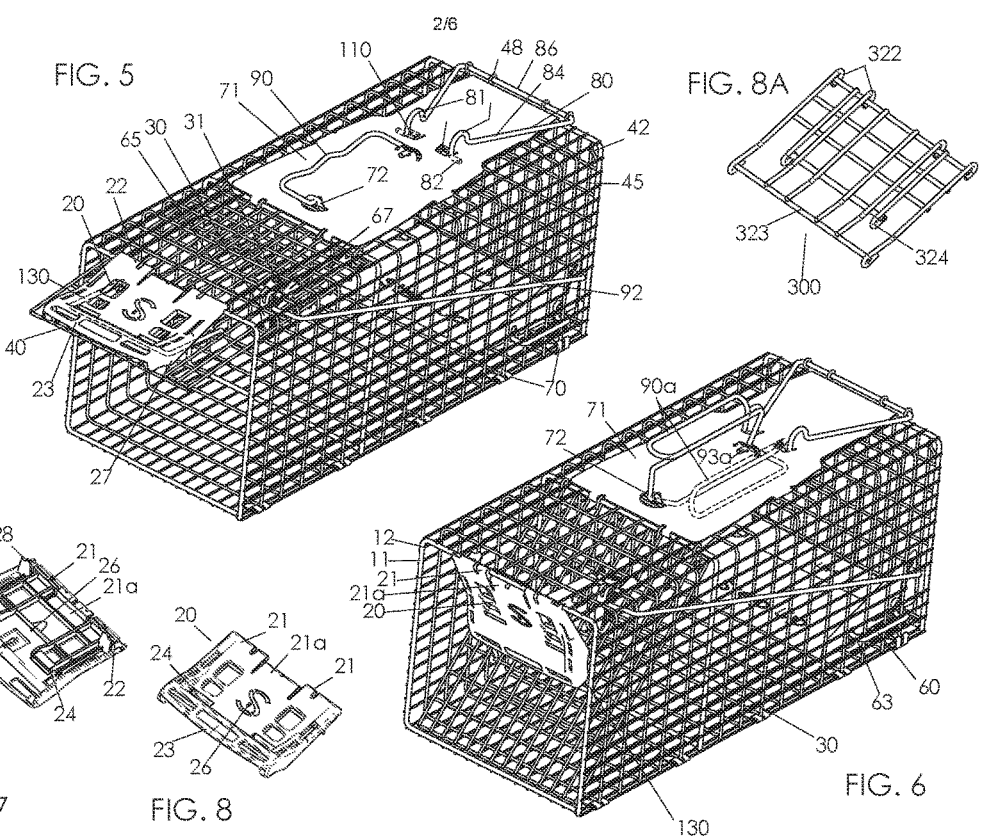

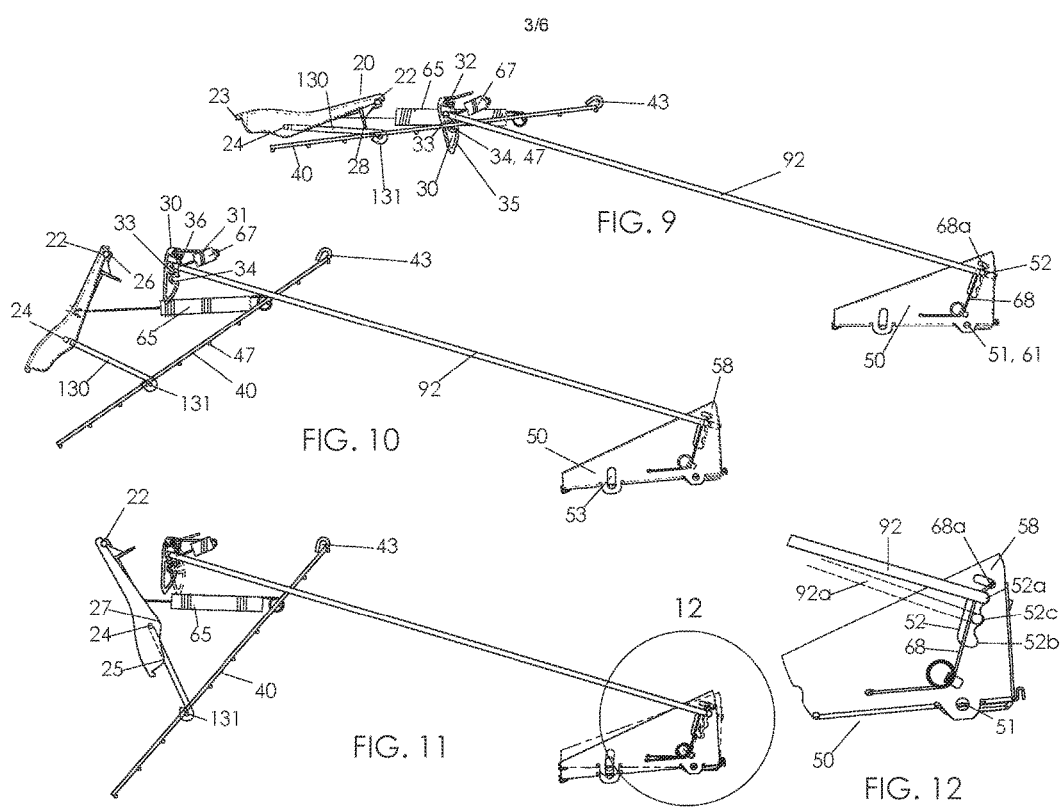

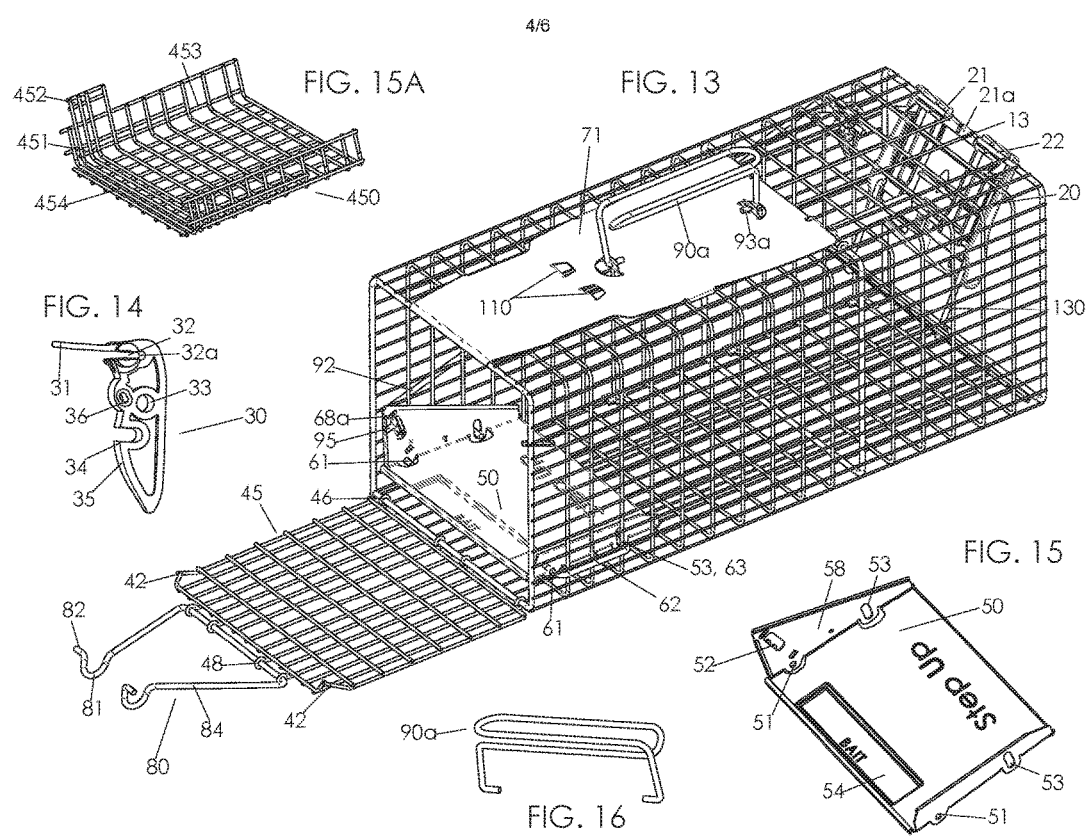

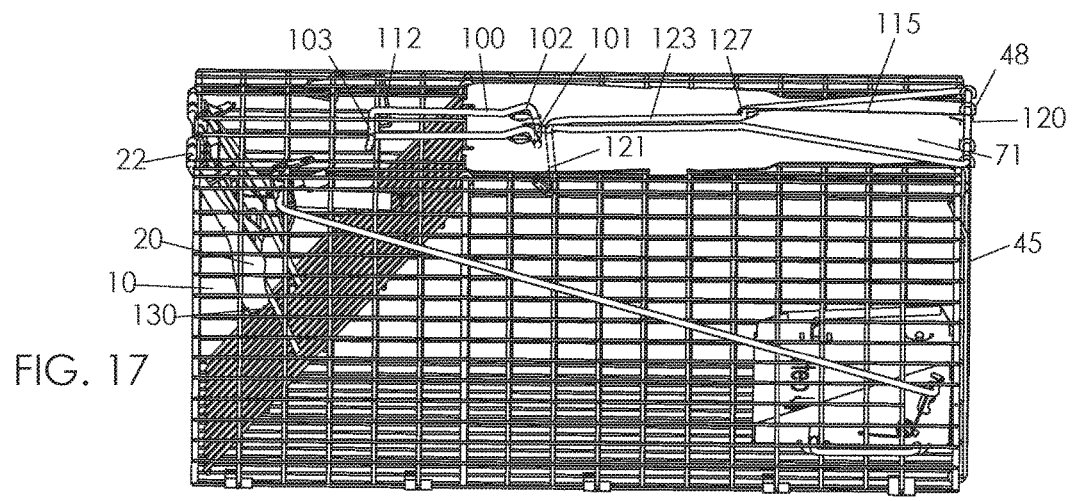
FIG. 17
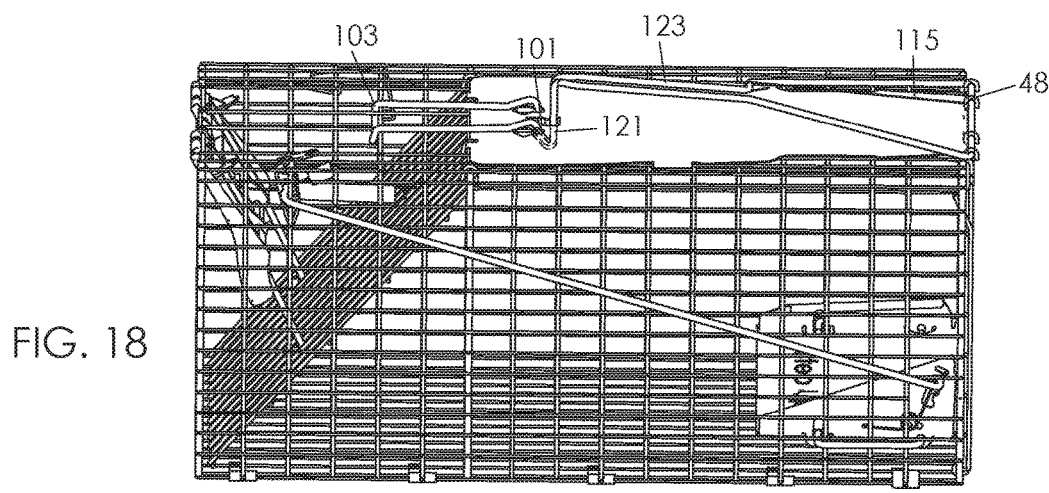
FIG. 18
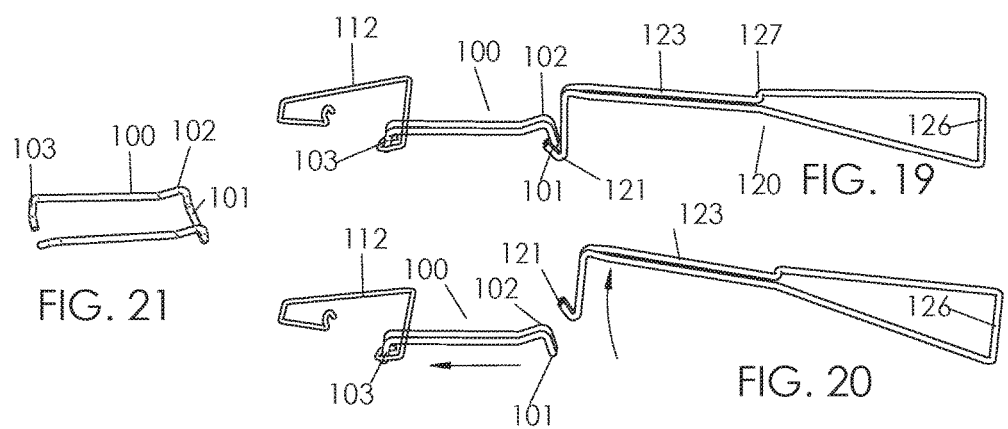
FIG. 19
FIG. 20
FIG. 21

ANIMAL TRAP WITH SIMPLIFIED, HIGH SPEED OPERATION

CROSS-REFERENCE TO RELATED APPLICATIONS

This is a continuation application of co-pending application Ser. No. 14/630,327, filed Feb. 24, 2015, which claims benefit of priority from provisional application No. 61/947,341, filed on Mar. 3, 2014, the contents of all of which are hereby incorporated by reference.

FIELD OF THE INVENTION

The present invention relates to live catch animal traps. More precisely, the invention relates to improvements in efficiency and ease of use of such traps.

BACKGROUND

Cage traps typically include a selectively open end to allow or prevent passage of a target animal into the enclosure of the cage. A door is mounted to an end either pivotally or slidably. A latch or similar structure holds the door in a set, open position. Bait is normally placed within the cage to entice the animal to enter the cage and press or move a trigger structure. The trigger is linked to the door latch whereby motion of the trigger or equivalent actuator causes release of the door to move from a door open position to a closed position.

SUMMARY OF THE INVENTION

In various preferred embodiments, the present invention is directed to a cage trap that includes a top, sides, a front door, a rear, and a bottom to form an enclosure for an animal, the top including a ceiling facing an interior of the enclosure. The front door is pivotally attached at the ceiling and includes a raised position and a lowered position, the raised position exposes an interior of the cage to allow animal access into the enclosure while the lowered position confines the interior of the cage to block an animal from exiting from the enclosure. A hold-close assembly connects the ceiling to the door and may include a two bar link with an upper bar pivotally attached at the ceiling at a separate and spaced first location from the pivotal attachment of the front door. The upper bar is pivotally attached to a lower bar at second movable location, and the lower bar is pivotally attached to the door at a third movable location. The lower bar of the hold close assembly is below the ceiling and folded to extend adjacent to the upper bar in the door raised position. The bars of the hold-close assembly unfold as the door moves toward the lowered position where the unfolded position has the hold close assembly extending from the ceiling down to a lower location of the door.

The hold-close assembly trips to secure the front door without sliding motions. A low friction latch and trip links thereto provide consistent set action resistant to shaking and undesired trip. An optional rear door is fitted next to a bait location to allow near vertical access for bait placement and unattended, unobstructed, consistent release with minimal time and environmental effects. A changeable torque arm provides adjustable trip force. A trip tray holding the bait is spaced above a floor to require a small set-up motion to access the bait and further ensure trip.

BRIEF DESCRIPTION OF THE DRAWINGS

FIG. 1 is a side elevation view of the cage trap according to a preferred embodiment of the invention showing superimposed views of the front door, including a set position, an intermediate position with the moving parts in phantom, and a closed position also in phantom.

FIG. 2 is a detail view of a latch in the set and normal tripped position.

FIG. 3 is the detail view of FIG. 2 with the latch in a release position.

FIG. 4a is a perspective view of a tie clip in a pre-assembled condition.

FIG. 4b is a perspective view of tie clip as assembled.

FIG. 5 is a front, side perspective view of the cage of FIG. 1 in the set position.

FIG. 6 is the cage of FIG. 5 in the closed position showing an alternative embodiment carry handle.

FIG. 7 is a bottom perspective view of a hold-close lift lever element.

FIG. 8 is a top perspective view of the lift lever of FIG. 7.

FIG. 8A is a top perspective view of an alternative embodiment lift lever.

FIG. 9 is a side elevation view of an assembly of moving parts of the cage trap in the set condition with other parts of the cage omitted for clarity.

FIG. 10 is the assembly of FIG. 9 in the intermediate position.

FIG. 11 is the assembly of FIG. 9 in the closed position, with a rebound condition of a tray in phantom.

FIG. 12 is a detail view of the trip tray showing first and second torque arm positions.

FIG. 13 is a rear perspective view of the cage trap showing the rear door opened.

FIG. 14 is a side, rear perspective view of a front door latch.

FIG. 15 is top, rear perspective view of the trip tray.

FIG. 15A is a top rear perspective view of an alternative embodiment trip tray.

FIG. 16 is a perspective view of an alternative embodiment carry handle.

FIG. 17 is a side perspective view of a trap with an alternative embodiment handle/rear lock combination in a locked down position.

FIG. 18 is the trap of FIG. 17 with the handle in a locked, up position.

FIG. 19 is the handle of FIG. 17 with only certain components shown for clarity.

FIG. 20 is the components of the view of FIG. 22 with the handle released.

FIG. 21 is a slide latch of the handle/lock assembly.

DETAILED DESCRIPTION OF THE PREFERRED EMBODIMENTS

Figure 22:
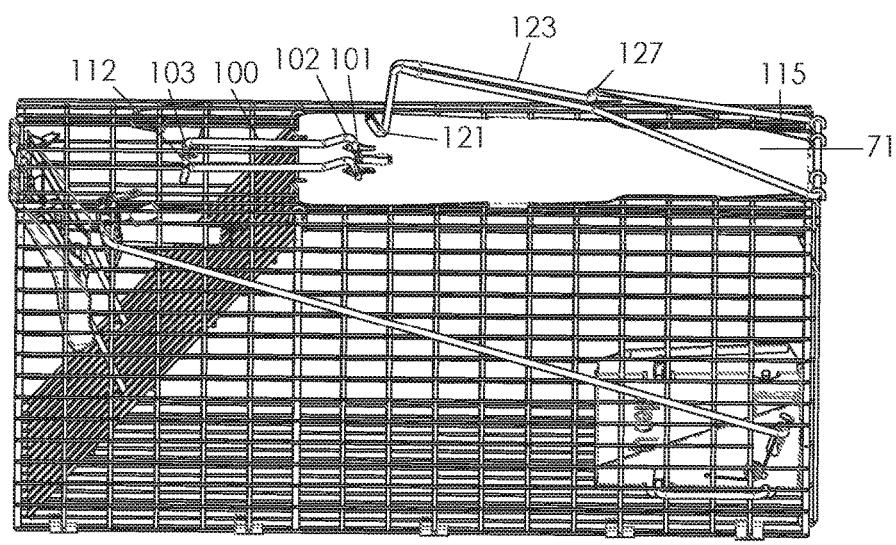
FIG. 22 is the trap of FIG. 17 with the handle/lock combination in a released raised condition.

In conventional traps, the manner in which the latch is set can affect the trip force. Further, the trip force may be affected by the duration of the set condition; for example, various weather conditions can change surface characteristics of moving trip features whereby the latch becomes relatively stuck or slippery in the set condition. Some traps are inherently subject to variations in trip force from complex or high friction designs. When the trip force is too low the door will shut inadvertently, for example, from the wind or an animal walking atop or next to the trap. Another cause of undesired trips can occur when the trap is moved to another location in the set condition. With too high a trip force, the animal will take the bait and walk back out freely. Users have been known to connect a string and trip a trap manually as the target enters when the trip force is too high. Such poor function defeats the expected feature of unattended use.

Typically, the trip force is not adjustable or such adjustment is not effective or convenient. If the local target animal is of differing weight from the factory trip setting, for example, lighter than expected, the bait will be removed by the animal while the door stays open. Similarly, if an untargeted animal is light weight, it can be useful to adjust the trip force higher. For example, if the target is squirrels but unintended rats and birds are also being caught, a higher trip force is indicated. However, this sort of selectivity requires a repeatable and consistent trip action that has not been available.

The present invention in various preferred embodiments shown in FIGS. 1, 5, and 6, includes improvements to the ease of use, effectiveness, size and cost for a live animal trap. As seen in FIG. 1, an entry door, shown as a front door, is hinged to a cage and includes an open set position near a top of the cage and a lower position pivoted toward the bottom of the cage. In the open position, a spring biased pivotal latch selectively holds the door wide open near parallel to the cage ceiling. The latch includes a cam surface to momentarily engage the door or equivalent closely linked structure whereby as the front door is lifted to the set position, the latch passively snaps into place under the spring bias. This set action is well defined, repeatable and allows the user to merely lift the front door with a single hand by a lift lever described below.

The front door includes a hold-close assembly. The assembly is biased, preferably by a spring element or alternatively by gravity, to move the front door downward or other closed or lowered position. The assembly is substantially entirely below the ceiling of the cage whereby the top of the cage remains relatively flat for efficient storage and shipping of the trap while the assembly acts substantially from above the front door. The assembly includes an upper actuating lift lever pivotally attached at a lever first end at or near the ceiling of the cage. A lower link is pivotally attached to the actuating lift lever at a spaced position from the lever first end. The lower link is further pivotally attached to the front door. The actuating lift lever and lower link together are respectively a two-bar link comprising three linked pivot hinges to form the hold-close assembly. The actuating lift lever and lower link are partially overlapped and folded near parallel in the upper door set position. Similarly, the front door is preferably substantially parallel to the lift lever and lower link in the set position. Such parallel or equivalently stacked elements provide a compact trap structure that fits largely within a space above the front door, between a vertical level of portions of the door and the ceiling, and preferably not higher than the ceiling of the cage. Incidental parts of the hold close assembly may extend above the ceiling. As the door closes the lift lever and lower link spread apart, unfolding to become again near parallel.

The assembly includes a stop to limit pivoting motion of the lift lever and lower link at the door closed position. This stop occurs as the three hinges move past an aligned position to a slightly misaligned position. This may form an over-center mechanism similar to a locked knee wherein a leg is extended and stable to hold the body up. This assembly preferably operates primarily through pivoting hinge motions with sliding actions limited to that within such hinges. With negligible sliding and short lightweight elements, the hold-close assembly is efficient and the front door closes rapidly with a light bias force and opens to set with minimal effort. The bias force and/or an optional detent latching structure on the hold-close assembly secures the door shut in the closed position.

For setting the trap, a grip area of the actuating lift lever may be located near or past the lower link pivot for a user to directly press and lift the hold-close assembly and door. As described here, pressing includes pressing upward from an under surface. The setting action is automatic and instantaneous upon completion of such lifting to near an upper limit of motion for the door. This simple setting action occurs with the lift lever or equivalent structure conveniently pressed at the cage front opening at a location below the ceiling. This contrasts with prior designs where a setting procedure is remote from the front door and/or requires indirect secondary actions from atop the cage or other location. The direct setting action illustrated herein requires only a short hand motion that corresponds closely to the door motion. In the example where the trap is placed upon a roof operable access to a lower location of the trap is useful.

An optional rear door of the cage opens preferably outward to provide an access for loading bait within the cage. Rather than reach deep into the cage to place the bait, a user can drop it almost directly downward into the location distant from the front door. According to a preferred embodiment, the rear door is hinged at a bottom so that is opens outward to readily expose the bait location from above as well as from a side.

A further feature of the rear door is for release of the occupant. The animal can step on the trip tray, plate or other equivalent release trigger as it moves around inside but the rear door, being preferably not linked to a trigger action, will remain open. For convenience, the trip tray will be called as such, or just a tray, but is not exclusive of a tray and may be other equivalently functioning structures such as a platform, plate, disk, channel, bar, button, dip, cup, ring, strip, or the like. With the preferred bottom hinge, the rear door is stable in the open position by simple gravity force as it extends open so the animal will see the large open rear end when the rear door is opened. A locking mechanism is fitted to the rear door, preferably at the top and spaced forward away from the rear door, to normally hold the rear door shut. The locking mechanism is manually released from substantially in front of the rear door so that a user is more safely spaced away from the rear as this exit opening is provided for the animal. The rear door has no normal dependency on a trigger means. In this manner, the trap is not structured as a two door entry system when set, although it is contemplated that such a configuration is possible if desired. In one example, a third, triggered door may be located away from the bait or the release door may also be triggered while maintaining direct access for placing bait.

It is preferable to have a trap that is long enough that the front door or equivalent closure shuts fully without hanging up on the animal before becoming secure. For this reason, a front, or equivalent triggered, door that is hinged at its rear end near the top of the cage is normally preferred. Such a door closes inward from above to help bump the animal inward in the case of any door interference. Another method to ensure the front door is clear is a longer or deeper trap whereby the bait location is farther from the door. But a more compact trap is inherently desirable for cost and convenience. A design that gets the animal as rearward as possible and shuts quickly will allow a most compact practical trap. Further, to operate reliably the force to trigger the door closing should be repeatable as seen in the present invention. Such closing forces due to a myriad of issues mentioned above (environment, rust, dirt, friction, etc.) are not predictable in prior designs.

To provide an effectively long trap, the trip tray is pivotally attached at a rear of the cage, preferably having a rear adjacent to the rear door or rear extent of the cage so that bait can be placed far away as possible from the front door. The tray normally extends forward, spaced above the cage bottom by, for example, about an inch for a typical rodent-sized cage. The pivotal mounting is preferably similarly spaced above the floor so the tray can be substantially horizontal with respect to a side view. The bait is normally placed on the rear of the tray near the tray pivot location since the tray extends to the rear of the cage. This contrasts with prior designs where the bait is normally placed on the cage floor between the rear end of the cage and a centrally positioned trip plate. The bait does not need to be placed on the rear floor of the cage since the floor there is covered by the tray. In operation, the animal enters the front of the cage and walks to the rear to access the bait. Doing so requires the animal to step up a small distance to rise onto the tray whereby the tray moves downward. This is a natural action that ensures the animal will not just extend its neck over the tray (over-necking) to get the bait but rather steps all the way back to the end of the cage. Empirical observations have shown this step-up structure to be an unexpected improvement against bait stealing even when applied to conventional traps. When combined with the further improvements disclosed herein, escapes and false trips are substantially eliminated. By having the tray raised, the bait is also raised so it is easily visible to the animal.

The trip tray includes an optional flange preferably bent upward from the base extending partially toward the ceiling above the pivot location. This flange creates a vertical torque arm that operates pivotally on a link to the front door latch where the arm preferably terminates below the cage ceiling. When the trip tray pivots downward, the flange pushes the link forward to pivot the latch and release the front door. In addition to being simple, this arrangement is low friction with no substantial sliding. The force to trip the tray is primarily from the bias spring preferably fitted to the latch. This single spring provides both functions to hold the latch in the set position and the trip tray in its upper position and reliably controls the trip force though the low friction system. Of course, additional springs and locations thereof may be used for these functions.

The pivot location of the trip tray is preferably forward from the rearmost location of the tray while the trip tray extends rearward of the hinge to the rear end of the cage. In this way the cantilevered front end is counter balanced to an extent by the rear overhang. This reduces tendency for false trips upon vertical motion to the cage as may occur, for example, when moving the set trap to nearby locations or animal bumping, while keeping the tray long enough to prevent over-necking.

The link from the trip tray to the latch may include an adjustable vertical position on the flange. In this arrangement, the torque arm can be changed to reduce or increase the trip force. There is no change to the pivot location of the tray so the motion of the trip action does not change when the trip force is changed. Further, the bias spring does not require any change in this embodiment. These are unexpected results of the present invention arrangement.

As a humane trap, the material of the cage is preferably designed so that the target animal can not extend its nose outside; in particular that it cannot easily bite the wire of the cage mesh. In an example of a squirrel, a 1"×1" mesh allows the animal to injure its snout or nose area as it bites the wire as has been empirically observed. Therefore, a ½"×1" or similar mesh is preferred in this example. However, the same heavy wire used for the 1"×1" mesh may be costly or too obstructive when used in the smaller mesh size. Therefore, the mesh may use differing wire diameters in regular intervals along the cage walls. For example, there may be a vertical 0.090" wire at 1" spacing with a 0.055" horizontal wire at ½" spacing. Or there may be every third wire is 0.090" with intervening wires at 0.055" for a given orientation of the wires. These spacing and diameter dimensions may be scaled according to the trap size and target animal size and weight.

An optional carrying handle structure in a preferred embodiment has a single wire form with a wavy gripping portion that normally rests atop the cage. The slightly raised segments provide a convenient area to grasp the handle and pull it up to its operative position without substantially raising the height of the trap structure. Conventional straight handle wires lie flat on top and are difficult to initiate a lift into position. In a further option, the handle includes a wire form with a three-dimensional path to provide multiple hand pressing points to improve user comfort over a single wire form. Such a handle also is easier to grasp and pivot up to its operational position from a lying position on the cage top. Such a three dimensional wire may be less costly than a molded handle and provides a unique and attractive visual appearance.

FIG. 1 shows operational states for a preferred embodiment of the invention. Front door 40 pivots about top hinge 43. As shown, hinge 43 is a loop of the wire of door 40. The set position is shown in solid lines wherein front door 40 is open, actuating lift lever 20 is in the upper position and lower link 130 is folded against lift lever 20. Lift lever 20 and lower link 130 form at least part of a hold close assembly. Stop rib 28 or equivalent structure contacts lower link 130 to provide an upper motion limit to the raised door and/or hold close assembly. See also FIG. 9. In the superimposed intermediate position (dashed lines), front door 40 has pivoted partly downward and the hold-close assembly of actuating lift lever 20 with lower link 130 is unfolding. In the closed position, also dashed lines, front door 40 is at or near its lowest position and actuating lift lever 20 with lower link 130 are fully unfolded. This closing front door 40 sequence is also shown in FIGS. 9 to 11. Door spring 65 preferably provides a bias to cause this rapid motion. Door spring 65 is preferably substantially parallel to the hold-close elements and front door in the set position as shown for a compact structure, as seen in FIG. 9. Upper lift lever hinge 22 cooperates with cage 10, at or near the ceiling thereof, while lower lift lever hinge 24 pivotally mates to lower link 130 toward a central area of the hold-close assembly. At a lower end of the hold-close assembly, lower hinge 131 of link 130 mates to front door 40. Upper hinge 22 is preferably substantially laterally aligned, sideways in FIGS. 1 and 9, with lower hinge 131 in the set position. Such alignment facilitates the laterally and vertically compact structure of the hold-close assembly. Lower hinge 131 maintains a continuous connection with no engagement event required to door 40 for a reliable and robust securing action and smooth opening action. Selective disengagement may be provided if certain clearances or geometries are desired.

The hold-close assembly as seen in the profile view of FIG. 1 is below a ceiling of cage 10. For example, hinges 24 and 131 are spaced below the ceiling through their respective operating positions. The surrounding structure of hinge 22 extends slightly above the top of the cage 10 as shown, and optionally incidental elements of lift lever 20, such as distal end 23, may extend higher than shown.

In the set and intermediate positions pivot 24 is in front of an imaginary line (not shown), connecting upper hinge 22 to lower hinge 131, with respect to the side view of FIG. 10. In the closed position, FIG. 11, pivot 24 moves to be near, at, or behind the imaginary line. The closed position is thus stable whereby a force from a captured animal or shaking of the cage will not allow the door to open. Whether pivot 24 is behind or near to the imaginary line the resilient force from door spring 65 holds the door closed condition. Door spring 65 pivotally engages actuating lift lever 20 at recess or tab 26, as seen in FIGS. 7, 8. In FIG. 11, stop limit 25 of lift lever 20 presses or engages lower link 130 to hold the closed condition, see also FIG. 7. If pivot 24 is slightly behind the imaginary line as shown in FIG. 11 then the hold-close assembly will be stable against opening forces up to the mechanical limits of the door and hold-close structures. Stop limit 25 may equivalently be located between elements of the hold-close assembly as shown or at either of cage 10 or front door 40. Other sources of holding force (not shown) may be used in addition to or instead of door spring 65. For example, a counterweight on the hold close assembly may bias it down and/or hold it shut; similarly, a drop weight at the end of a pivoted lever arm, or drop weight on a pulley system are contemplated. Further, a releasable detent latching action (not shown) between the hold-close assembly and cage, or the cage and the door, or within the hold-close assembly may hold the assembly in the closed position of FIG. 11.

Lift lever 20 may be made from molded plastic. It can then be structured to assemble using snap fits. In FIGS. 7 and 8 upper lift lever hinge 22 extends through transverse tabs 21 and 21a. Tabs 21 are longer than tab 21a. To assemble, the lift lever to a wire of the cage tabs 21 are positioned against a top of the cage wire. The lift lever is then pressed rearward and down on tab 21a. Tab 21a deflects downward relative to tabs 21 to clear and then snap in place to largely surround the cage wire 10a at hinge 22. Likewise lift lever 20 may be snap fitted to lower link 130 at pivot 24. Hinge 24 forms a C shape open toward the front to partly surround the wire of the lower link. The wire is pressed rearward to move upon ramp 24a until it snaps into place. The C shape at outer hinge pivots 24 also includes a snap fit function. The hold-close assembly of actuating lift lever 20 and lower link 130 are normally assembled together at pivot 24 before attaching at hinge 22 and lower hinge 131. Lower hinge 131 is preferably a U shaped hook before assembly that is further formed about a wire of door 40 to pivotally hold it to the door. Rib 27 confines lower link 130 laterally within hinge 24.

Optionally lift lever 20 may be made from sheet metal or mesh with portions bent or formed to assemble it. FIG. 8A shows a wire lift lever 300. Cage hinge 322 includes loops to wrap a wire of cage 10. Pivot 324 fits to lower link 130. Distal end 323 provides an interface for pressing from below and a stop limit against link 130 similar to that of stop limit 25 of lift lever 20. Optionally, the distal end may be covered, painted, or coated in plastic for comfort and identification as an operating area. Furthermore, a single formed wire (not shown) may provide the structure for the lift lever, for example, with loops at an end to form the cage hinge.

As seen in the drawing figures, the hold-close assembly in the preferred embodiment acts on front door 40 entirely through pivoting motions. In this embodiment, there are no sliding features required within the assembly to bias and secure the door shut other than minimal internal sliding within the respective pivots. In this manner, the trip action of door closing is rapid, smooth and repeatable. Sliding elements may optionally be included, for example, of a distal end of lift lever 20 against door 40.

To set the trap, lift lever 20 is lifted, normally at distal end 23, to rotate clockwise in the views. Upper lift lever hinge 22 and front door hinge 43 describe axes that are substantially parallel to each other, extending laterally across a width of cage 10. Lift lever 20 is thus pulled outward to unlock the door and then upward in an intuitive motion that is similar to that of adjacent front door 40. This action is normally a singe motion and makes the hold-close assembly nearly transparent in its use being similar in perception to opening the door without any intervening structure. In accordance with this embodiment, the lift lever may be described as acting as a surrogate door which parallels the actual door motion. As an unexpected result, this natural motion has been well noted by test users and highlighted for them the deficiencies of prior conventional designs. Lower link 130 pulls front door 40 to its upper set position with door 40 and the hold-close elements being near parallel to the cage ceiling to provide a large trap entrance. In contrast, conventional trap doors are commonly set at a larger downward angle in a manner that further limits the cage opening. The lift lever and link of the hold-close assembly are not accessible by an occupant of the cage when the door is closed so the door remains secure until an operator lifts the lift lever or equivalent action from outside.

Optionally, lift lever 20 may be actuated to set by a tab of the lever beyond hinge 22, above this hinge in FIG. 11 for example (not shown). A further link to lift lever 20 or door 40 may also provide for rotating lever 20 or door 40 from locations other than distal end 23 to set the trap. This link may be the lower edge or other part of front door 40 where the door is directly lifted after the door is initially unlocked. In an alternative embodiment (not shown), a gear or other type of structure to engage lift lever 20 may provide such a link.

Latch 30 extends downward from the cage top and is pivotally attached to or near the cage ceiling at pivot 32, FIGS. 2, 3 and 14. Preferably the latch extends inward to the enclosure of the cage as shown with no substantial external elements. This preserves a compact structure for the trap. Latch pivot 32 preferably fits to a wire of cage 10 by partially surrounding the wire. Latch 30 may include slot 32a extending further past pivot 32, FIG. 14. In this manner, pivot 32 can expand slightly to allow a snap fit of the latch to the cage wire. This fitting system has been empirically demonstrated to be effective in this context. Link pivot 33 pivotally connects to a lateral arm of trip link 92. Set spring pivot 36, FIG. 14, connects to set spring 67, see also FIGS. 9 to 11. Set spring pivot 36 is spaced from latch pivot 32 so set spring 67 causes a rotational bias on latch 30. Shelf 34, or equivalent structure, selectively engages wire 47 of front door 40, FIG. 9, under the bias of set spring 67. Tab 31 provides a structure to directly and conveniently rotate latch 30 to release the trap from the set position. For example, if the trap is set and is to be transported or stored it may be desirable to do so with the door closed. The quick release also provides an effective pre-purchase demonstration of the trap's improved function.

Below shelf 34 is cam 35 on an underside of the shelf. Moving from the position of FIG. 10 toward the position of FIG. 9 as front door 40 is raised, lateral wire 47 of the door contacts and slides upward along cam 35 to pivotally deflect the latch. Cam 35 preferably acts against the motion of door 40 at a shallow angle, for example, an angle less than about 30° as shown and further preferably less than about 45° or other angle consistent with a smooth, reliable and continuous raising and latching motion of door 40, based on empirical observations. When shelf 34 becomes aligned with the wire the latch snaps into position under bias of set spring 67 to hold the door open. This latching action is repeatable for all manner of use; for example, it is near impossible that the latch will partially engage or engage too firmly. Latch 30 is preferably of molded plastic, for example, low friction Delrin, whereby the features of the latch can be included in a single part while the actions at cam 35 and elsewhere are smooth and efficient. Delrin or equivalent material also is less susceptible to changes in friction properties with weather exposure than metal on metal; therefore, the release action will be repeatable. Other latch materials are contemplated such as cast or formed metal including coated metals. Alternatively, a rotational locking cam pivoted to latch 30 or equivalent structure (not shown), may include low operating angles to provide equivalent low latch engagement force.

Latch 30 is limited at a rest position in its counterclockwise motion by link bar 92 or other connection. This rest position is normally the same or close to the set position of FIG. 9. At this limit set spring 67 provides a preload bias force to the latch. In accordance with this structure set spring 67 provides a relatively constant force to latch 30 through its normal motion, being substantially preloaded in the normal tripped, door lowered, tray up position of FIG. 11.

With the latching structures described above the latching force is relatively low. For example, if the lifting force on lift lever 20 is a maximum of about 0.75 lb., the added force to engage and deflect latch 30 may be about 0.15 lb., or 20% of the lifting force as measured in a working model. Preferably, it will not exceed about 50% of the lifting force or more generally not to exceed about 1 times the lifting force. Along with the previously discussed features of the hold close assembly and door, lift lever 20 and/or door 40 can be lifted to set with a light enough force that it is not required to hold down the cage during setting while the door still trips faster than many prior conventional designs. Optionally, a stiffer set spring 67 and/or door spring 65 or similar may be used.

It is known to use a wire or metal formed hook to hold a pivoted door open. However, such hooks include a default unlatched position that requires a secondary action to move the hook into place. Even if such a hook were movably held in a latched position as the front door were raised the angle of an underside of a prior hook is close to 90° and at least past 45°. So it is not well suited for automatic or passive deflection by a cam for latching on a shelf. In accordance with the preferred embodiment herein, set spring 67 provides a relatively constant force to latch 30 through its normal motion, being substantially preloaded in the normal tripped, door lowered, tray up position of FIG. 11. This preload, for example, is greater than a minimum required to hold tray 50, discussed below, in its set or raised position. As door 40 is raised to be latched set spring 67 moves to engage latch 30 to door 40. The set spring force rises only slightly during this engagement as latch 30 is deflected from an already loaded condition, for example less than about 50%.

With the geometry shown in FIGS. 9 to 11, it is seen that door spring 65 acts nearly parallel to the lift lever and lower link 130 in the set condition of FIG. 9, with just sufficient angle to quickly initiate the door motion. In the closed condition of FIG. 11, this action is closer to perpendicular. Spring 65 thereby acts through varying leverage on the hold-close assembly to wedge it with minimum leverage at the start and more leverage toward the closed condition. At the same time spring 65 is more deflected with a higher pulling force in the set condition. With spring leverage and pulling force inversely proportional, the force to open door 40 during set does not have an excess peak toward the upper set position and becomes firmer toward the closed position. In fact, the downward force on the door will tend to be lower when set in the upper position. With a lower set force, the friction to disengage latch 30 upon shelf 34 is reduced. Also, the force will not be excessive on the door to lift it through its full motion. Prior traps can have very high set forces.

A captured animal will naturally react as the door is tripped. To an extent that such reaction has any effect it will be later in the door closing cycle. The low friction wedging action of the hold-close assembly will have increasing force on door 40 as described above and the mechanical advantage and speed rise toward the spread condition of FIG. 11. The animal is therefore especially unlikely to successfully resist the closing action even if it can manage to act upon the door from the distant rear position from which the tray is tripped.

Door spring 65 may be attached at its rear end to a wire of door 40 as shown, FIG. 11 or to the ceiling of the cage. With the door attachment, both the front and rear door spring mountings move together, although to a different extent. Therefore, the total deflection of the spring is reduced over the ceiling mounted option and the force through the spring cycle is more constant. The lower position rear spring mounting also provides more angle relative to actuating lift lever 20 for better initial leverage to start the door closing. Front door 40 is preferably of mesh rather than sheet steel. This lighter weight door will further improve the speed of closing. A further optional feature that speeds closing is the light weight and short rotating moment arm of lift lever 20 and lower link 130. With a less efficient design as common in the prior art, a stiff closing spring is used. This forceful solution requires a high effort setting procedure. Optionally, sheet steel or other materials may be used for door 40. A stiff plastic sheet has also been demonstrated to be effective as a front door and will work well as long as there are no edges accessible for biting by the occupant.

Although the friction to disengage at shelf 34 is minimal, the set condition is stable. The force from preloaded set spring 67 reliably and robustly holds the set condition even as the trap is moved or shaken.

Trip link 92 preferably connects latch 30 to a rear of trip tray 50, FIGS. 11 and 12. This link is a direct connection with no intermediate links or sliding contacts. As shown trip link 92 is of a straight rod form. The trip link fits to slot 52 in tray flange 58. Flange 58 is preferably formed as a bend in the sheet metal of trip tray 50. Slot 52 includes at least one recess, detent, or stable pivot location for the link. As shown in the drawings, there are three such available detents for pivot locations, including the upper one 52*a* used in most of the drawing figures as well as center pivot 52*c* shown in phantom in FIG. 12 and further lower pivot 52*b*. Optionally, slot 52 may form a simple hole or equivalent structure for a non-adjustable design.

Set spring 67 preferably biases the various set and trip parts toward the set position of FIG. 9 as it pushes link bar 92 to the right in the drawing figures. Since there is minimal friction in the system this single spring can perform these multiple functions. When the animal steps up on the trip tray the tray pivots downward about axle 61 at tray pivot 51 as seen in FIG. 1. Tray flange 58 or equivalent structure moves forward to push on trip link 92 to the left, as in FIG. 10. After the front door closes to the position of FIG. 11, the tray will rebound to the upper position with the corresponding latch position under the preloaded bias of set spring 67 (as shown in phantom lines), as the animal moves off the tray within the trap. The tray can toggle between these positions in the closed door position under the spring bias. As shown, a single set spring 67 at latch 30 biases both the latch and the trip tray through trip link 92. These parts will preferably move in unison. Optionally, one or more set springs may be at the tray location or elsewhere along the latch, trip link and tray assembly.

As the occupant moves around the tray will toggle up and down. This has no direct effect on the occupant. The repeated tray motions when occupied may also be used to provide trip and occupied signals through further devices such as a radio transmitter, visual signals such as a flag, etc. (not shown). Optionally, there may be a means to hold the down position of the tray (not shown) when the door is closed.

A torque arm is formed by the distance between tray pivot 51 and the selected operative pivot in slot 52, or equivalent vertical distance, so that the axial force upon link 92 can preferably be adjusted depending how far link 92 is from pivot 51. Since the torque arm moves forward and latch 30 is in front of the trip tray trip link 92 can operate directly to pivot the latch forward as shown. As shown, the torque arm has a slight upward orientation and slot 52 is angled. This further aligns the action of the trip link with latch 30 as the latch is above the location of trip tray 50. Trip link 92 extends directly from a lower rear area of the cage to an upper front area for a rigid link without bends or out of line joints. With such a direct link motions of the trip tray are accurately transmitted to latch 30. The torque arm as shown preferably terminates substantially below the cage ceiling. For example, the length of tray 50 is substantially greater than the torque arm distance, preferably being between about 3 to 5 times the torque arm distance while ratios of between about 1 to 10, inclusive of the outer limits, are contemplated. These proportions are based on empirical studies performed that were beyond routine testing.

Optionally, the trip tray may be configured to pull upon trip link 92 if, for example, flange 58 extends downward and latch 30 operates in an opposite direction (not shown). Furthermore, such a tensile connection may be useful with an upward flange as shown in a two-triggered door design, for example, if a rear door similar to door 40 is configured to be triggered (not shown). Then the tensile link (not shown) pivots at slot or pivot 52 or equivalent action to pull a latch similar to latch 30 near a rear triggered door. Compressive link 92 continues to operate as shown with the optional separate rear door link. Such a two-triggered door trap would normally be longer than the single door trap of the drawing figures. In a further alternative embodiment (not shown), pivot 51 may be toward a front of trip tray whereby pressing the tray down at the rear would push or pull upon link 92.

In the link position of upper pivot 52a, FIG. 12, the force required to trip the latch is higher since there is less leverage to press the link forward. It follows that in the lower pivot position of 52b the trip force is lower. In an example from a working model directed to squirrels, the trip force measured at the front of the trip tray adjusts from about 2, 2.5 and 3 lbs. for the three exemplary force settings although this force range may be readily modified by changing the set spring properties and/or the torque arm distance. More generally, the force is primarily driven by the stiffness of set spring 67 for a given pivot selection. There is minimal friction in the trip action. From the working model example, the effect on the force from friction to disengage the latch shelf is less than about 5% of the total force. For example, with about a 2.5 lb. trip tray force, preferably through the bias of set spring 67, the action of the latch disengaging from wire 47 adds about 1 to 2 oz. In prior art trap designs, the trip force is affected by time set, environment, and other geometric or frictional factors. According to the preceding discussion, the trip force of the present invention is very consistent, being proportioned directly by the set spring force.

Trip tray 50 includes detent spring 68 to hold trip link 92 in a selected recess in the force-adjustable embodiment. To change the force setting link bar 92 is pushed up or down near its rear end. Tab 95, FIG. 13, is then easily slid or moved vertically to click between recesses of slot 52 to a selected recess. Detent spring 68 includes leg 68a in a slot of flange 58 to retain the spring and provide a stop limit to the spring's rearward position. Detent spring preferably includes a central coil mount to trip tray 50 and a lower end mount. The motion and pivot mounting at axle 61 is not affected by changes to the position of the link bar at tab 95 so the trip motion of tray 50 will be consistent for different force settings.

An alternative embodiment structure (not shown) to adjust the trip force is to change the preload of set spring 67. For example, a mounting may be pivotally attached to the ceiling wire of cage 10. This mounting is further connected to a lever or other user input device. The rear end of spring 67 then connects to this mounting. Moving the lever will adjust the position of the rear of the spring and thus the preload and trip force at trip tray 50.

Axle 61 is preferably mounted slightly spaced forward from the rear of tray 50. In the exemplary trap targeting squirrels and similar creatures, this distance is about 0.5 to 1 inch. This is to improve stability upon vertical shaking. The portion of tray 50 rearward of axle 61 provides a partial counterweight to the longer cantilevered portion forward of the axle. There is then less inertia to tend to pivot the tray as the cage is shaken vertically. Such shaking can occur from an animal investigating the trap from outside or from moving the set trap. This can be especially useful when the trap is to be placed in a difficult to access area whereby pre-setting it may be most convenient. With the pivot location as shown tray 50 is elongated front to back, both forward and rearward from axle 61 to ensure the animal cannot over-neck the tray to reach the bait. In the exemplary trap, this length dimension is about 4 to 6 inches inclusive, although it may normally be different for different trap sizes targeting various animals.

In FIG. 13, axle 61 is shown as an end of a large diameter bent segment 62 of mesh material. Forward arm 63 extends into the cage interior to engage slot 53 of the tray. Slot 53 provides an upper limit stop for the motion of tray 50 while allowing downward trip motion.

FIG. 15A shows an alternative embodiment wire mesh trip tray 450. The mesh can allow better visibility of bait and possibly lighter weight than a sheet metal tray. The wires of the mesh are spaced closely in selected positions to create square shaped opening 451 for axle 61 and opening 452 for tab 95 of trip link 92. Opening 452 may be arranged to provide multiple positions for force adjusting as discussed above. Bait area 454 also may include closely spaced wires as shown for holding the bait or a bait cup (not shown).

Rear door 45 is fitted to cage 10 at rear most end 10*b*. Preferably door 45 pivots outward from a bottom hinge as seen in FIG. 13. Loop 46 of the mesh of door 45 is shown as the hinge. To allow independent motion of the rear door, axle 61 for tray 50 is preferably mounted to the cage structure, for example, upon the cage sides as shown at bent mesh segment 62. This contrasts with a tray hinge or axle attached to a rear wall of the trap. Alternatively, a fixed portion of a rear wall may extend up to the tray level (not shown). The tray and rear door 45 may then be both hinged about a top of this fixed short wall.

Rear door 45 operates to easily expose the bait location as indicated by the optional text "BAIT" embossed or printed on optional recess 54 of the trip tray, FIG. 15. Cage 10 maintains its rectangular prism shape both with door 45 closed and opened wherein rear door 45 is not an essential structural element of cage 10. With the large opening at the rear a user can place bait on the tray other rear location of the trap, without reaching through front door 40. With a conventional single door trap, such full length reaching is uncomfortable and often requires lifting the cage up to arm level to enable the reach. Further such reaching is potentially unsanitary as it likely leads to contact with the interior of the cage. In contrast, rear door 45 being near or adjacent the bait location of tray 50 allows placing bait in a nearly straight down direction. More generally, opening door 45 exposes the bait location from nearly directly above, for example, by a less than about 45° angle off vertical and preferably by less than about 20°. In contrast, a conventional trap requires a near 90° direction off vertical, or substantially horizontal, to reach and place the bait. Optionally, a door may be located in the ceiling of cage 10 near the rear to enable vertical bait placement. Further, a rear of cage 10 may be angled with the top being forward of the bottom and door 45 similarly angled. Then the bait location can be directly vertically exposed with door 45 opened.

Rear door 45 preferably includes bent corners 42, FIG. 13. When closed, as in FIG. 1, these tabs extend forward past rear most end 10*b* to link the rear door to the structure of cage 10 by contact with the interior of the cage. Door 45 thereby adds structural support to the rear of cage 10 when closed and prevents the animal from forcing the gap beside door 45 wider by distorting cage 10. Front door 40 inherently provides this function since it is largely confined by the cage in its closed position.

A further feature of rear door 45 is for convenient release of the captured animal. In a conventional trap, the trip door must be held open for release. This normally requires setting the trap. However, it is common that the animal does not immediately leave especially if it has been in the cage for a while. Instead the animal will move around and trip the trap door or doors. So a user may need to secure the front door or other doors by further means or remain present to reopen the trap door until the animal leaves. In contrast, rear door 45 of the present preferred embodiment is not linked to a trip mechanism and includes a stable open position independent of any trip device. With door 45 fully opened and flat or nearly so on the ground the animal can see an unobstructed view outside, with the possible exception of lock 80, 80*a*, or handle/lock 120. So it will be more likely to leave quickly. According to the embodiments described below, the rear door is released through a connection that is at least partly remote from the rear end. A user can thus safely open the door for animal release while staying away from the being-opened rear end of the cage.

Rear door 45 may be hinged on a side (not shown) to still allow access to the bait location from above and unattended release of the animal. Further, the rear door may be hinged from the top to open inward. In this example, the door may extend partially down ending at the short wall of the cage rear (not shown) with the partial wall being behind the bait location. An advantage of the preferred bottom hinged, outward opening door is its stable fully open position as simply controlled by gravity.

To selectively hold rear door 45 closed lock 80, FIG. 5, is preferably of a wire form with free ends at its front above top plate 71. In the locked condition tabs 82 extend into openings 110. Lock 80 is inherently secure against pressing outward on door 45. As door 45 is forced outward tabs 82 will tend to spread because of pulling by angled arms 84. So tabs 82 are further secured within openings 110. To open the rear door a user squeezes loops 81 or equivalent structure with a single hand to deflect tabs 82 inward until the tabs are no longer confined by the outer edges of openings 110 or equivalent confining structure. The rear door with lock 80 is then free to be pulled upward away to allow door 45 fall to its open position of FIG. 13. Then lock 80 can lie flat on the ground a shown or flat upon door 45 when the door is open. To close the door lock 80 is pulled toward its locked position as loops 81 are squeezed and tabs 82 installed into openings 110. Lock 80 is thus easily operated by one hand. Lock 80 is preferably pivotally attached to the door as shown at loops 48 of the door mesh or equivalent structure.

Figure 24:
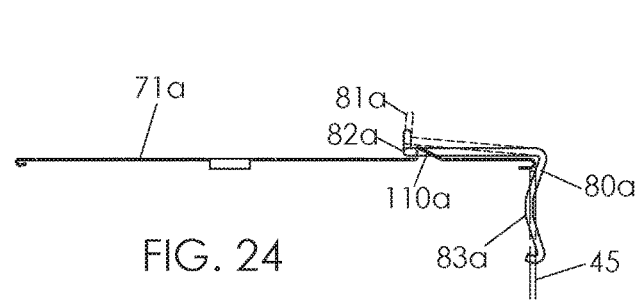
FIG. 24 is a detail view of a further embodiment rear door lock structure.
Figure 24A:
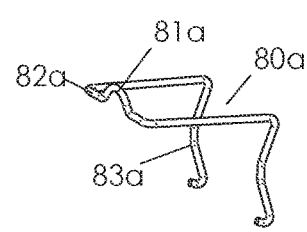
FIG. 24a is a perspective view of the lock of the structure of FIG. 24.

An alternative embodiment rear door lock is shown in FIGS. 24 and 24*a*. Door 45 and lock 80*a* flex as the door is shut to allow bar 84*a* to ride up ramp 110*a* of top plate 71*a* and resiliently latch in front of the ramp. This resilience is from small deflections of door 45 and the wire of lock 80*a*. To assemble lock 80*a* to rear door 45 the two downward legs are installed within the mesh and bend 83 is optionally pressed flatter in a one-time operation to fix the lock to the door. As with lock 80 above, lock 80*a* holds the door securely against internal pushing; as the animal pushes on the rear door small outward deflections of the door cause tabs 82*a* to be biased down against top plate 71*a* so that lock 80*a* is held even more tightly behind ramp 110*a*. To open lock 80*a* a user pulls up on loop 81*a* while optionally using another finger to push down with a reaction force on top plate 71*a*. In this manner, the lock of 80*a* is easily operated with a single hand.

Figure 23:
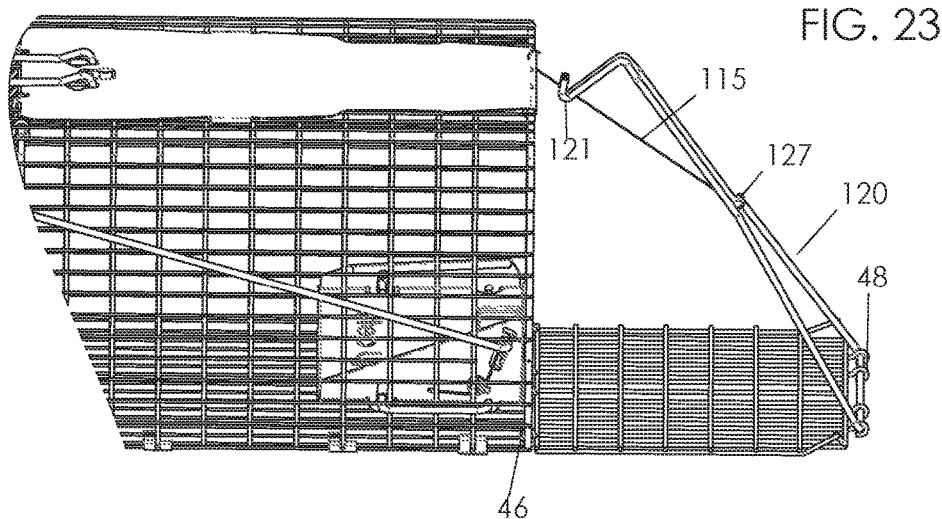
FIG. 23 is the trap of FIG. 22 with the rear door opened.

FIGS. 17 to 20 show a further embodiment combination rear door lock and carry handle or handle/lock 120. Handle/lock 120 is pivotally attached to the top of rear door 45 in a similar manner as lock 80. The handle/lock extends forward past a center of the cage to selectively engage slide lock 100. Slide lock 100 is slidably fixed to the top of cage 10. Central portion 123 includes two substantially parallel bars as shown and forms a carry handle in the upper locked position of FIGS. 18 and 19. With at least two rigid spaced part bars carry handle 123 provides a stiff connection for a user to hold and control the trap as it is carried. The handle/lock includes a lowered locked position shown in FIG. 17. In this position, the roof of the trap is largely flat for efficient storage and shipping. When raised for carrying, hook 121 engages cross bar 101 of slide lock 100 to form an upper motion stop. To open rear door 45 the handle/lock is released as in FIGS. 20 and 22. For release, slide lock 100 is pressed forward, left in the drawing figures, at hump 102 or other pressing point. Cross bar 101 clears hook 121 whereby handle/lock 120 may be lifted away and rotated about hinge 126 to the open position of FIG. 23. Optional flexible link 115 holds the assembly as shown in FIG. 23 for convenient access to re-close the rear door. If flexible link is not preferred the open rear door and lock may take an equivalent position as shown in FIG. 13 for lock 80. Bend or kink 127 provides a stable mounting for flexible link 115. Optionally, link 115 may be of a rigid or multi-link bar form. To secure handle/lock 120 into the locked position the forward end near hook 121 is pressed downward while the angle of hook 121 urges cross bar 101 forward and then to click rearward into the position similar to FIG. 19. This operation advantageously requires only a single hand. Alternatively, slide lock 100 may be manually moved forward to clear hook 121 for closure. Bias spring 112 is fitted to cage 10 to bias slide lock 100 rearward at end 103. The handle/lock combination design has been shown to work well and to be easy to operate.

Other rear door locks may be used, not shown, for example, a twist cam lock, a spring loaded latch, deadbolt and other structures are contemplated. It is preferable but not required that rear door 45 is operable with a single hand. As noted above front door 40 is easily and reliably set with one hand, which is an unexpected result of the present invention.

Handle 90a, FIGS. 6 and 13, is shown as a single wire form. It includes a serpentine path with at least three substantially parallel and non-planar wires at the gripping area, although two parallel wires would provide some of the benefits of such a handle. This structure forms a three-dimensional segmented shape. It is pivotally attached to top tray 71 at ends 93a to include an operative position and a lower position, phantom lines FIG. 6. The multiple spaced wires spread the load on a user's hand. This three-dimensional shape contrasts with a common wire form handle wherein the single wire sharply presses the hand. Further, the three-dimensional wire is easier to lift from the lowered position since the user can pull from under one of the wires spaced above the top tray. To install handle 90a to top tray 71, the handle is spread apart at ends 93a. The folded structure of handle 90a provides substantial resilience to allow for ends 93a to spread readily and also to extend inward well past bent tabs 72 of top tray 71. Thus, handle 90a will be securely fitted but may be installed after purchase. In this case handle 90a may be stored inside cage 10 for shipping. Pulling up on the handle slightly bends the handle and biases ends 93a together to further to engage tabs 72 so that more upward force on handle 90a gives more holding at tabs 72.

FIGS. 1 and 5 show a further handle 90 of a single loop form in a lowered position. As seen the top bar of the loop has a serpentine or wavy path. This shape facilitates lifting the handle to its operative upright position, not shown. The higher locations of the wavy top bar provide an accessible under-surface to grasp and lift handle 90. The wavy shape also widens the top bar in a noticeable way for increased carrying comfort.

FIGS. 4a and 4b show tie clip 70. In FIG. 4a the clip is opened as it appears before assembly to cage 10. This pre-assembled clip is also shown in the rear most position in the assembly drawings. As best seen in FIGS. 5 and 6 clips 70 surround two spaced parallel wires of the floor mesh of cage 10. Distal end 70a stabilizes the clip so that the joint of cage 10 will not move up and down as can occur with a conventional circular style clip. A conventional clip acts as a swiveling link that allows two adjacent wire to move while the clip rotates. To compensate such clips must normally be crimped very tightly. The stabilized clip 70 does not require excess crimping to join an edge securely. Clip 70 may also serve as a hinge. In the imaginary configuration that the right side wall of FIG. 5 were to pivot outward similar to the motion of rear door 45 (not shown), clip 70 would effectively allow this function.

While the particular forms of the invention have been illustrated and described, it will be apparent that various modifications can be made without departing from the spirit and scope of the invention. It is contemplated that elements from one embodiment may be combined or substituted with elements from another embodiment.

What is claimed is:

1. An animal trap, comprising:
a cage including a top, sides, a front, a front door at the front, a cage rear, and a bottom to form an enclosure for an animal, the top including a ceiling facing an interior of the enclosure and a cage length between the cage front and cage rear;
a rear door pivotally attached at a cage bottom rear including an open position and a closed position, the open position exposing an interior of the cage, the closed position confining the interior of the cage; and
a lock pivotally attached to a top of the rear door to selectively hold the rear door in the closed position, the lock elongated to extend forward along the top of the cage from the rear door to a lock front end, the lock front end selectively engaging the cage at a top of the cage near a central location of the cage length, the lock being operable from near the central location to disengage the lock from the cage and free the rear door to move from the closed position to the open position.

2. The animal trap of claim 1, wherein the lock includes a resilient arm, the arm extends from an arm attachment at the rear door to an arm distal end at the lock front end, a first position of the arm includes the lock front end being confined by a structure of the cage to hold the rear door closed, a second position of the arm includes the arm being deflected to be no longer confined by the structure of the cage to allow the rear door to be opened.

3. The animal trap of claim 2, wherein two opposed resilient arms extend forward from arm attachments at the rear door to arm distal ends at the lock front end.

4. The animal trap of claim 3, wherein the opposed arms are spaced apart at the arm attachments, the distal ends of the arms are relatively angled to be spaced closer together at the distal ends, and distal ends include tabs that selectively engage a confining structure of the cage.

5. The animal trap of claim 4, wherein an outward pressing force on the rear door causes the tabs to be further secured to the confining structure as a result of the relative angle between the arms.

6. The animal trap of claim 3, wherein the arms extend along an exterior of the top of the cage.

7. The animal trap of claim 6, wherein the arms include a loop, the loop extends upward from the top of the cage to be operable by a single hand moving the arms together to unlock and open the rear door.

8. The animal trap of claim 1, wherein the cage central location includes a top plate, and the lock front end engages the cage at a location of the top plate.

9. An animal trap, comprising:
a cage including a top, sides, a front, a front door at the front, a cage rear, and a bottom to form an enclosure for an animal, the top including a ceiling facing an interior of the enclosure and a cage length between the cage front and cage rear;
a rear door pivotally attached at a cage rear including an open position and a closed position, the open position exposing an interior of the cage, the closed position confining the interior of the cage; and a lock attached to the rear door to selectively hold the rear door in the closed position, the lock includes a resilient arm elongated to extend from an arm attachment at the rear door to an arm distal end at a lock front end, a first position of the arm includes the lock front end being confined by a structure of the cage to hold the rear door closed, a second position of the arm includes the arm being deflected to be no longer confined by the structure of the cage to allow the rear door to be opened.

10. The animal trap of claim 9, wherein the lock front end engages the cage near a central location of the cage length, and the lock is operable from near the central location.

11. The animal trap of claim 9, wherein the lock front end is resiliently movable with respect to the structure of the cage, and an outward force on the rear door causes the lock front end to be biased to be further secured by the confining structure.

12. The animal trap of claim 9, wherein the lock is operable from a position substantially in front of the rear door.

13. The animal trap of claim 9, wherein the lock includes two arms and the second position includes each arm being deflected away from the confining structure of the cage.

14. The animal trap of claim 13, wherein the two arms are spaced from each other at the lock front end and the arms are squeezed together to be in the second position.

15. An animal trap, comprising:
a cage including a top, sides, a front, rear, a cage length between the cage front and cage rear, and a cage bottom to form an elongated enclosure including a cage interior within the enclosure and an external region outside of the enclosure;
a front door pivotally attached at the front of the enclosure;
a rear door pivotally attached by a hinge adjacent a cage rearmost end including an open position and a closed position, the open position exposing an interior of the cage, the closed position confining the interior of the cage;
the rear door extending forward within the interior of the cage at a rear door location spaced from the hinge, the rear door thereby linked to the interior of the cage to add structural support to the cage to resist forcible distortion of the cage; and
a lock selectively linking the rear door to the cage through an arm of the lock to hold the rear door in the closed position, the lock operable from the external region to deflect the arm and disengage the rear door from the cage to free the rear door to move from the closed position to the open position.

16. The animal trap of claim 15, wherein the rear door extends forward at a bent corner of the rear door.

17. The animal trap of claim 16, wherein the lock is attached to the rear door at a location adjacent to the bent corner.

18. The animal trap of claim 15, wherein the lock is pivotally attached to the rear door at a rear door location spaced from the hinge.

19. The animal trap of claim 15, wherein a first position of the arm includes the lock front end being confined by a structure of the cage to hold the rear door closed, a second position of the arm includes the arm being deflected to be no longer confined by the structure of the cage to allow the rear door to be opened.

20. The animal trap of claim 19, wherein the lock includes two arms and the second position includes each arm being deflected away from the confining structure of the cage.

* * * * *